(12) United States Patent
Bovell et al.

(10) Patent No.: US 8,180,860 B2
(45) Date of Patent: May 15, 2012

(54) WIRELESS DEVICE CONFIGURATION MANAGEMENT

(75) Inventors: Matthew C. Bovell, Middlebury, CT (US); Thomas P. Devlin, Boynton Beach, FL (US); Amy S. Goodner, Longmont, CO (US); Tedrick N. Northway, Wood River, IL (US); Paul H. Usery, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 2292 days.

(21) Appl. No.: 10/925,338

(22) Filed: Aug. 24, 2004

(65) Prior Publication Data
US 2006/0046717 A1  Mar. 2, 2006

(51) Int. Cl.
*G06F 15/16* (2006.01)
(52) U.S. Cl. ......... 709/220; 709/217; 709/223; 709/227
(58) Field of Classification Search .................... 709/220
See application file for complete search history.

(56) References Cited

U.S. PATENT DOCUMENTS

| | | | |
|---|---|---|---|
| 6,847,858 B2 * | 1/2005 | Arnold et al. ................. | 700/216 |
| 2002/0070846 A1 | 6/2002 | Bastian, II et al. | |
| 2003/0117316 A1 | 6/2003 | Tischer | |
| 2003/0154266 A1 | 8/2003 | Bobick et al. | |
| 2003/0191650 A1 * | 10/2003 | Turner et al. ...................... | 705/1 |
| 2003/0225893 A1 | 12/2003 | Roese et al. | |
| 2003/0235172 A1 | 12/2003 | Wood | |
| 2004/0002943 A1 * | 1/2004 | Merrill et al. ...................... | 707/1 |
| 2004/0053602 A1 * | 3/2004 | Wurzburg .................. | 455/412.1 |
| 2004/0203593 A1 * | 10/2004 | Whelan et al. ................ | 455/411 |
| 2004/0205151 A1 * | 10/2004 | Sprigg et al. ................... | 709/217 |
| 2005/0289047 A1 * | 12/2005 | Oliver et al. .................... | 705/39 |
| 2006/0030315 A1 * | 2/2006 | Smith et al. ................ | 455/432.3 |

* cited by examiner

*Primary Examiner* — Benjamin R Bruckart
*Assistant Examiner* — Sulaiman Nooristany
(74) *Attorney, Agent, or Firm* — Schmeiser, Olsen & Watts; Arthur J. Samodovitz (57) ABSTRACT

A method for providing wireless device management. The method comprises receiving a first request for wireless devices comprising specified software. The specified software is loaded on each of the wireless devices in response to the first request. The wireless devices comprising the specified software are delivered. The wireless devices are connected to a wireless network. Wireless configuration management is provided the wireless network for each of the delivered wireless devices for a specified amount of time.

20 Claims, 7 Drawing Sheets

WIRELESS DEVICE CONFIGURATION MANAGEMENT

BACKGROUND OF THE INVENTION

1. Technical Field

The present invention relates to a method for providing configuration management for wireless devices.

2. Related Art

Systems within electrical devices typically require modifications to perform efficiently. Therefore there is a need for modifying systems within electrical devices.

SUMMARY OF THE INVENTION

The present invention provides a wireless device management method, comprising:

receiving a first request for wireless devices comprising specified software;

loading said specified software on each of said wireless devices in response to said first request;

delivering said wireless devices comprising said specified software, connecting each of said delivered wireless devices to a wireless network; and providing wireless configuration management through said wireless network for each of said delivered wireless devices for a specified amount of time.

The present invention provides a wireless device management method, comprising:

requesting wireless devices comprising specified software;

receiving said wireless devices comprising said specified software in response to said requesting;

connecting each of said received wireless devices to a wireless network; and receiving wireless configuration management through said wireless network for each of said received wireless devices for a specified amount of time.

The present invention provides a wireless device management method, comprising:

receiving a first request for new wireless devices comprising specified software;

retrieving data from currently used wireless devices, wherein the currently used wireless devices are connected to a wireless network;

loading said specified software on each of said new wireless devices in response to said first request;

loading said data on each of said new wireless devices;

delivering said new wireless devices comprising said specified software and said data;

disconnecting each of said currently used wireless devices from said wireless network;

connecting each of said new wireless devices to said wireless network; and providing wireless configuration management through said wireless network for each of said delivered wireless devices for a specified amount of time.

The present invention provides a wireless device management method, comprising:

requesting new wireless devices comprising specified software;

submitting data from currently used wireless devices, wherein the currently used wireless devices are connected to a wireless network;

receiving said new wireless devices comprising said specified software and said data in response to said request;

disconnecting each of said currently used wireless devices from said wireless network;

connecting each of said new wireless devices to said wireless network; and receiving wireless configuration management through said wireless network for each of said received wireless devices for a specified amount of time.

The present invention advantageously provides a method for modifying systems within electrical devices.

DETAILED DESCRIPTION OF THE INVENTION

Figure 1:
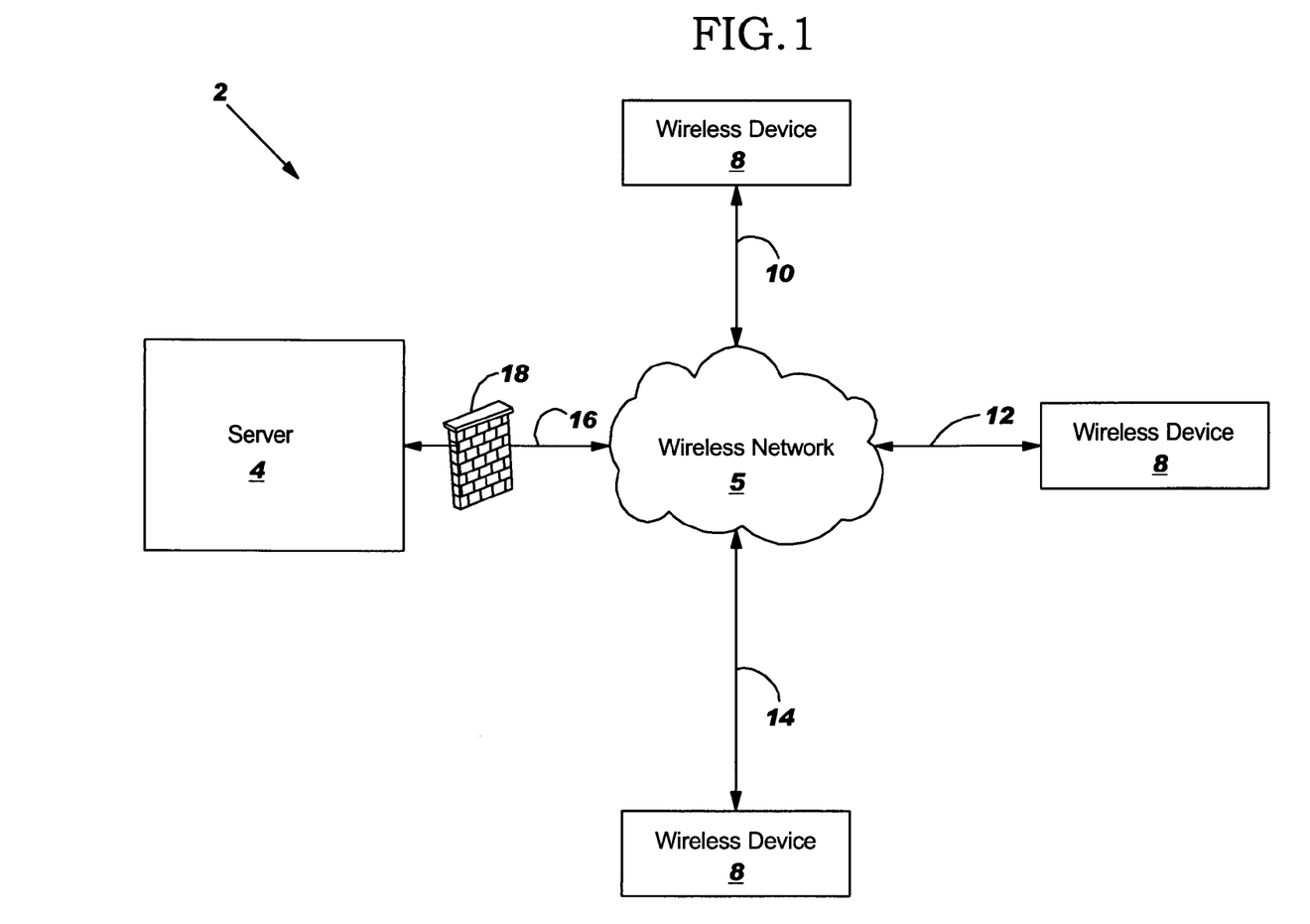
FIG. 1 illustrates a block diagram view of a system for providing a wireless configuration management method for wireless devices, in accordance with embodiments of the present invention.

FIG. 1 illustrates a block diagram view of a system 2 for providing a wireless configuration management method for wireless devices 8, in accordance with embodiments of the present invention. A server 4 (within an integration center) is electrically connected to a wireless network 5 through a wireless link 16. The integration center is a facility housing the server 4 and is an operations center for activating and maintaining the wireless devices 8 as described, infra. The server 4 may comprise one server or a plurality of servers. A firewall 18 may be used between the server 4 and the wireless network 5 to prevent any unauthorized access to the server 4. Any firewall known to a person of ordinary skill in the art may be used including, inter alia, a hardware firewall, a software firewall, etc. A plurality of wireless devices 8 are electrically connected to the wireless network 5 through wireless links 10, 12, and 14. The server 4 provides wireless configuration management for wireless devices 8 through the wireless network 5 for a specific life cycle. The term "wireless configuration management" is defined herein as a process to plan and perform maintenance for the wireless devices 8. The maintenance is performed remotely over the wireless network 5 and may include such functions as, inter alia, performing software updates, upgrades or fixes, downloading new database images, downloading new software applications (e.g., programs), etc. The term "life cycle" is defined herein as a time frame (i.e., a specified amount of time for maintaining the wireless devices 8; e.g., a contract to maintain the wireless devices 8 for a specified number of years. The wireless devices 8 may be any wireless devices known to a person of ordinary skill in the art including, inter alia, a personal data assistant (PDA), a pocket personal computer, a cellular telephone, a laptop computer, etc.

Figure 2:
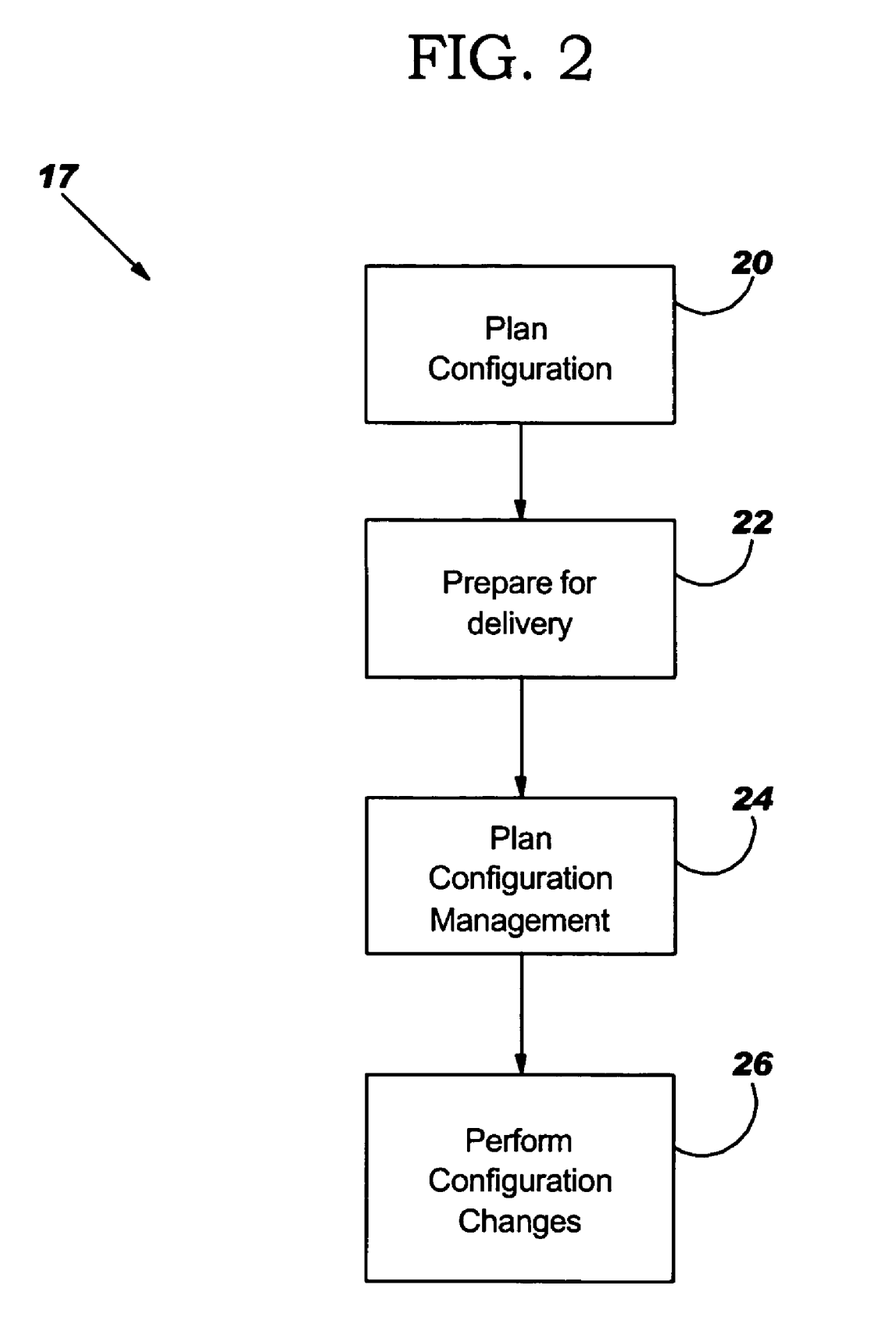
FIG. 2 is a flowchart illustrating an algorithm detailing an overview for providing a plurality of wireless devices to a service requester pre-loaded with specific applications, in accordance with embodiments of the present invention.

FIG. 2 is a flowchart illustrating an algorithm 17 detailing an overview for providing a plurality of wireless devices (e.g., wireless devices 8 in FIG. 1) to a service requester (e.g., a customer) pre-loaded with specific applications (e.g., software) according to the service requester's specifications and maintaining remotely, the specific applications, in accordance with embodiments of the present invention. In step 20 (described in detail with reference to FIG. 4), a service provider plans a configuration for a plurality of wireless devices (e.g., wireless devices 8 in FIG. 1) according to specifications provided by the service requester. For example, the service requester requests to a service provider, wireless device(s) (e.g., wireless devices 8 in FIG. 1) pre-loaded with specific applications (e.g., software) and comprising specific hardware and the service provider plans a configuration according to the request. Additionally, the service requester requests to the service provider a specific wireless network carrier (e.g., wireless network 5) for the wireless devices 8. In step 22 (described in detail with reference to FIG. 5), the service provider prepares the wireless devices 8 for delivery. In preparing the wireless devices 8 for delivery, the service provider pre-loads the wireless devices with the specific applications and hardware and provides (e.g., delivers) the wireless devices to the service requester. Steps 24 and 26 combined represent wireless configuration management. In step 24 (described in detail with reference to FIG. 6), a plan for configuration management (i.e., a maintenance plan (e.g., software configuration)) is developed for the wireless devices 8. In step 26 (described in detail with reference to FIG. 7), the maintenance plan (i.e., perform configuration management) is implemented for the wireless devices 8.

Figure 3:
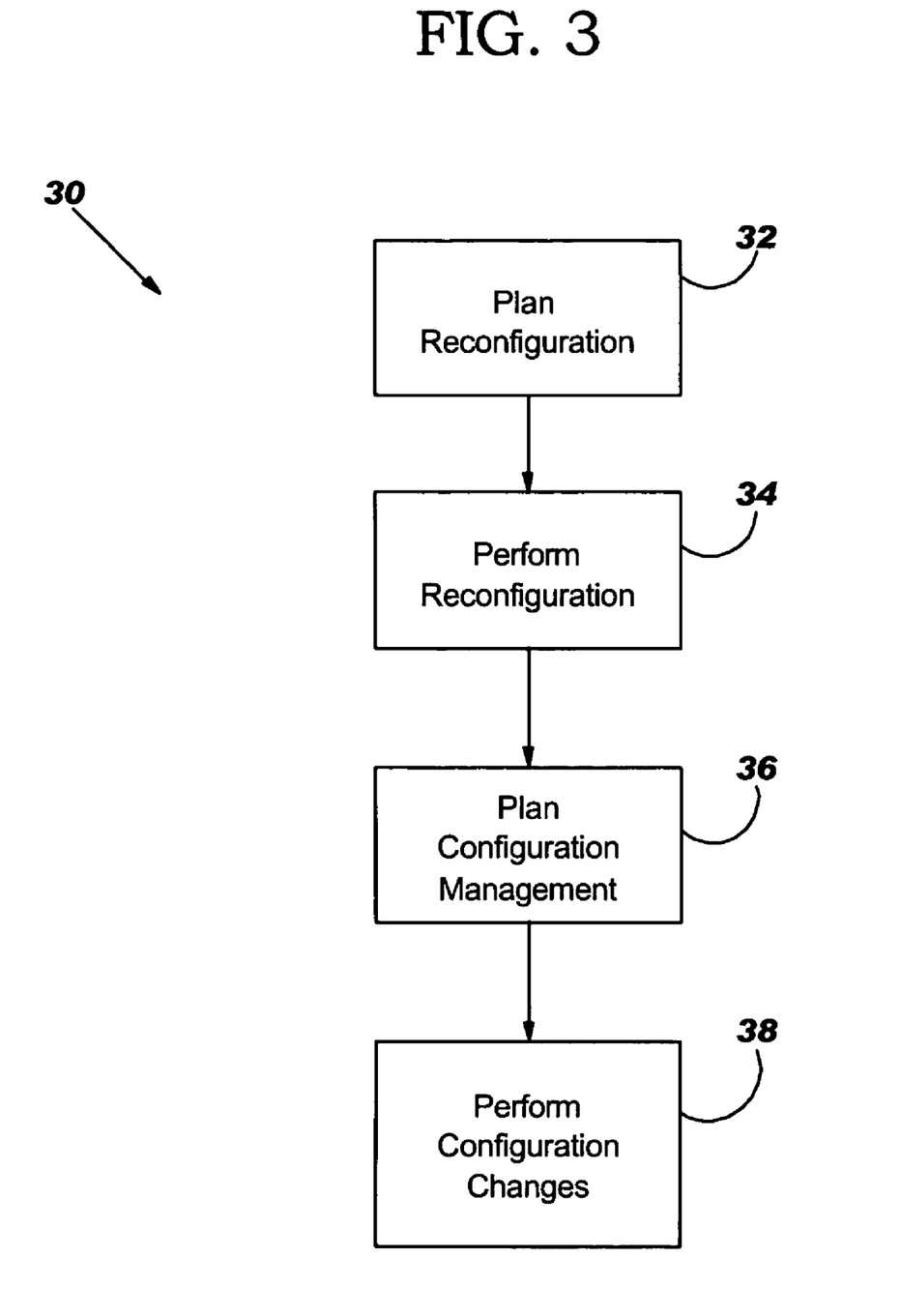
FIG. 3 is an alternative to FIG. 2 showing flowchart illustrating an algorithm, in accordance with embodiments of the present invention.

FIG. 3 is an alternative to FIG. 2 showing flowchart illustrating an algorithm 30 detailing an overview for remotely providing configuration management for a plurality of wireless devices (e.g., wireless devices 8 in FIG. 1) for a service requester (e.g., a customer) according to the service requester's specifications, in accordance with embodiments of the present invention. In contrast with the algorithm 17 of FIG. 2, the algorithm 30 of FIG. 3 assumes that the service requester (e.g., a customer) already has the plurality of wireless devices and wants to have them reconfigured. In step 32, a service provider plans a reconfiguration for a plurality of wireless devices (e.g., wireless devices 8 in FIG. 1) according to specifications provided by the service requester. The service requester requests to a service provider, to have the wireless device(s) (e.g., wireless devices 8 in FIG. 1) reconfigured (e.g., a software application change or modification) and the service provider plans a reconfiguration according to the request. In step 34, the reconfiguration is performed (i.e., the service provider reconfigures the wireless devices remotely over the wireless network 5). Steps 36 and 38 combined represent wireless configuration management. In step 36 (described in detail with reference to FIG. 6), a plan for configuration management (i.e., a maintenance plan (e.g., software configuration)) is developed for the wireless devices 8. In step 38 (described in detail with reference to FIG. 7), the maintenance plan (i.e., perform configuration management) is implemented for the wireless devices 8.

Figure 4:
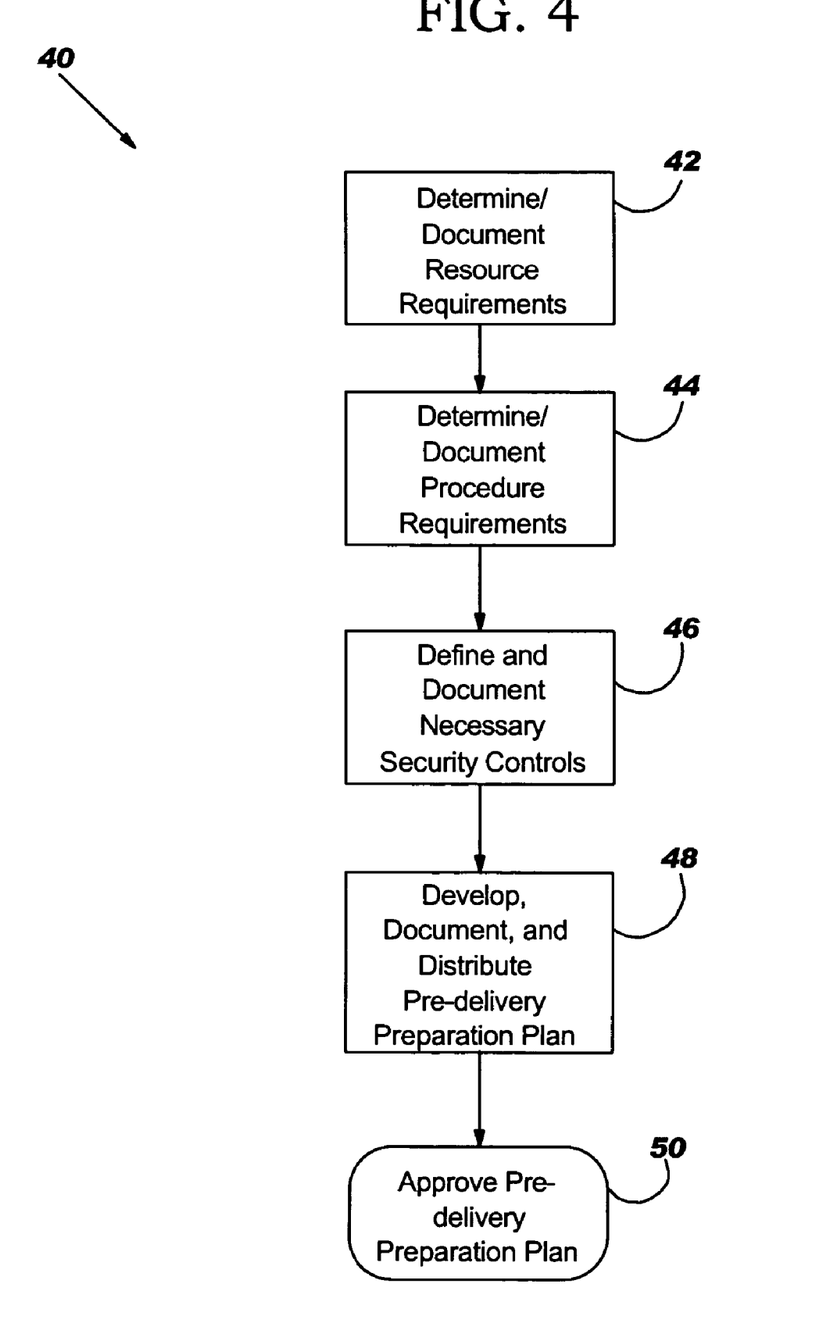
FIG. 4 is a flowchart illustrating an algorithm detailing the configuration planning step of FIG. 2, in accordance with embodiments of the present invention.

FIG. 4 is a flowchart illustrating an algorithm 40 detailing the plan configuration step 20 of FIG. 2, in accordance with embodiments of the present invention. The algorithm 40 addresses the development and planning of hardware and software configuration requirements for the wireless devices 8 according to the service receiver's specifications. In step 42 resource requirements are determined/documented (i.e., the service receiver provides to the service provider, input information stating a desired configuration (e.g., specified hardware and software to be installed) and wireless device type (e.g., a personal data assistant (PDA), a pocket personal computer, a cellular telephone, a laptop computer, etc). A detailed resource requirement specification is developed which identifies the wireless device(s) specification as it relates to creating standard software loads. The detailed resource requirement specification comprises information such as, inter alai, wireless device type (e.g., a personal data assistant (PDA), a pocket personal computer, a cellular telephone, a laptop computer, etc), hardware installation requirements including revision levels, tool requirements, software installation requirements including version requirements and specific configurations, wireless device 8 configuration testing information, etc. In step 44, the service provider determines/documents procedure requirements (i.e., the service provider defines (i.e., creates definitions) and begins to craft a required server (e.g., server 4 in FIG. 1) infrastructure, software and device availability, and wireless network 5 air time requirements). The definitions comprise availability requirements for standard configurations as required by the service receiver and/or wireless device type. The procedure requirements comprises wireless device type, hardware assembly layouts, hardware testing procedures, software installations and configuration builds, initialization and wireless device testing procedures, etc. The resource specification and procedure requirements may be loaded into a catalog database for service receiver and service provider reference. Additionally in step 44, the resource specification and procedure requirements are defined in an agreement (i.e., a contract) between the service provider and the service receiver. In step 46, appropriate/required security controls are defined and documented by configuration or device type. In step 48, a pre-delivery preparation plan is developed, documented, and delivered. The pre-delivery preparation plan finalizes a plan for hardware/software installation and configuration process. The pre-delivery preparation plan also comprises test of the method to ensure the wireless device(s) will conform to the service receiver specifications. In step 50, the pre-delivery preparation plan is approved for use for the pre-delivery preparation process of the algorithm 17 of FIG. 2 and described with reference to FIG. 5.

Figure 5:
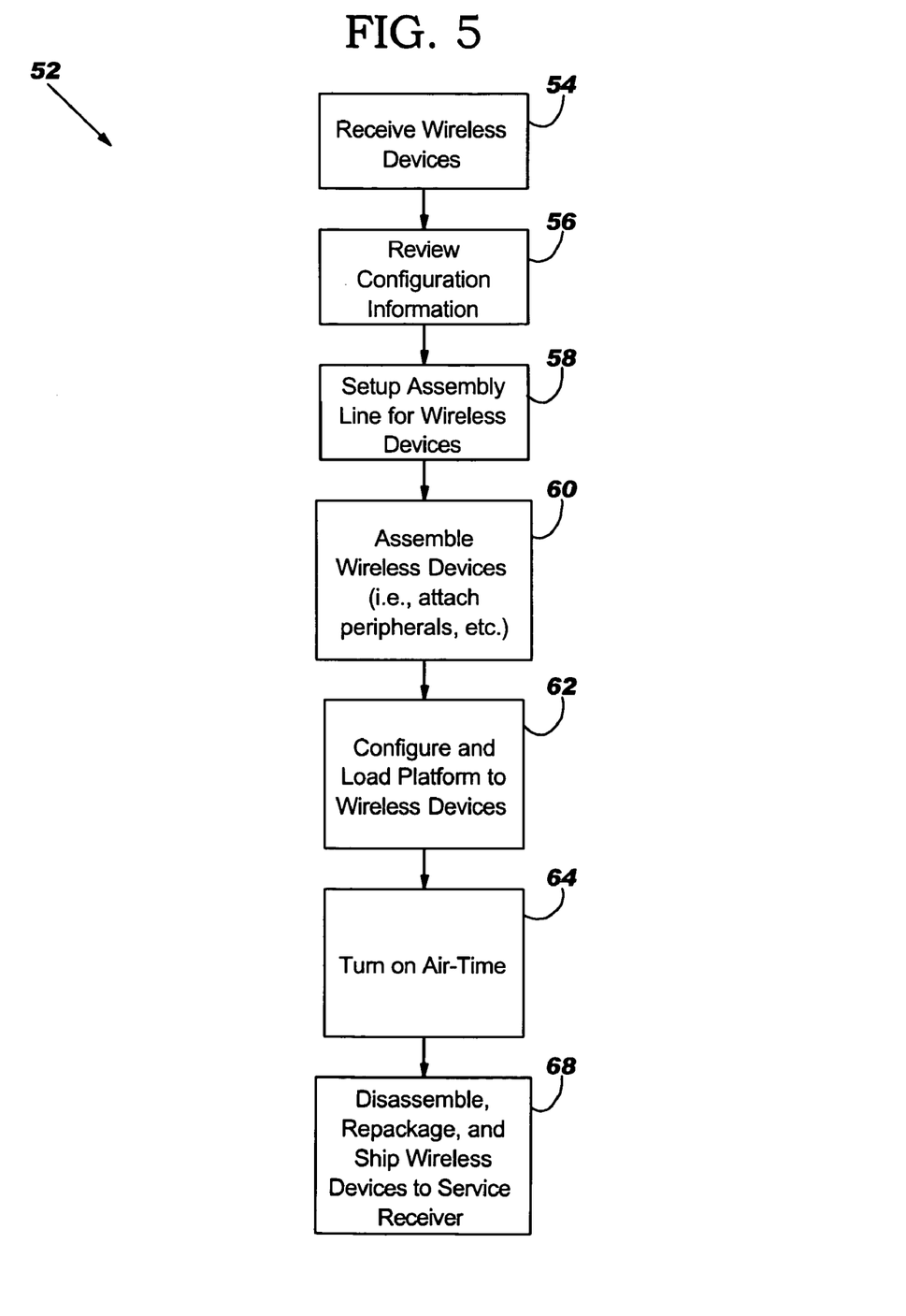
FIG. 5 is a flowchart illustrating an algorithm detailing the pre-delivery preparation process step of FIG. 2, in accordance with embodiments of the present invention.

FIG. 5 is a flowchart illustrating an algorithm 52 detailing the preparation for delivery process step 22 of FIG. 2, in accordance with embodiments of the present invention. In step 54, the wireless devices 8 are received by the service provider (i.e., wireless devices 8 are ordered and received from a vendor (e.g., a third party manufacturer) or pulled from an inventory (i.e., from service provider)). The wireless devices 8 are now available for assembly (e.g., hardware peripherals) and configuration (e.g., hardware and software) according to the service receiver's specifications. In step 56, technicians for the service providers will review configuration information to ensure that sufficient information (i.e., information gathered from step 20 of FIG. 2) exists to perform configuration (hardware and software) of the equipment. In step 58, an assembly line based on wireless device 8 type (i.e., hardware type and software required) is developed. Any special tools needed to support the assembly line are organized and placed on benches for the technicians to use. In step 60, the technicians assemble hardware (i.e., wireless devices 8 and peripherals) as required (according to service receiver specifications) and perform appropriate validation test(s) (i.e., to check for proper functionality). In step 62, wireless device 8 software is installed and the device is configured, as required by the service requester, and appropriate software validation tests are performed (i.e., to check the software). The software will be loaded onto the wireless devices 8 using the specific tools, cables, and adapters identified in step 58. The technician(s) will also configure the software with required personalization or addressing information according to instructions from the service requester. Additionally, hardware validation test(s) are performed as required by the service receiver. Hardware testing ensures that features are recognized and peripherals are functional. In step 64, air time is activated (i.e., turned on) for the wireless devices 8 (i.e., the wireless devices 8 are activated with the wireless network carrier selected in step 20 of FIG. 2). Requirements for air time with the wireless network carrier are based on service requester specifications. The ability to activate air time depends on the following factors:

- A geographic coverage area of the wireless network carrier selected by the service receiver.
- A location of an integration center in relation to the wireless network carrier's coverage area.
- A signal strength of the wireless network carrier's network within the service provider's facility.
- A delay time to turn on the air time coverage (i.e., amount of time for wireless network carrier to activate air time).

The technicians will follow local policy to ensure that during the activation process or before contract transition starts, the integration center checks to make sure they actually have the ability to access the carrier network locally, and specifically from within the facility. If the wireless device 8 is an exchange (i.e., a replacement wireless device for a defective wireless device), air time coverage will need to be switched from the defective wireless device to replacement wireless device. In step 68, the wireless devices 8 are packed in original packages with documentation (e.g., operating instructions). All wireless devices 8 that were unpacked and set up on the bench for integration or configuration will be re-packed in their original packages, and any documentation or media that accompanied the device will be included as well. Additionally in step 68, any peripherals that were attached to devices on the bench for testing will be detached from the wireless devices 8 and packaged separately. A set of registration instructions for activating the wireless devices 8 will be provided for the service receiver. The wireless devices 8 are delivered to the service receiver.

Figure 6:
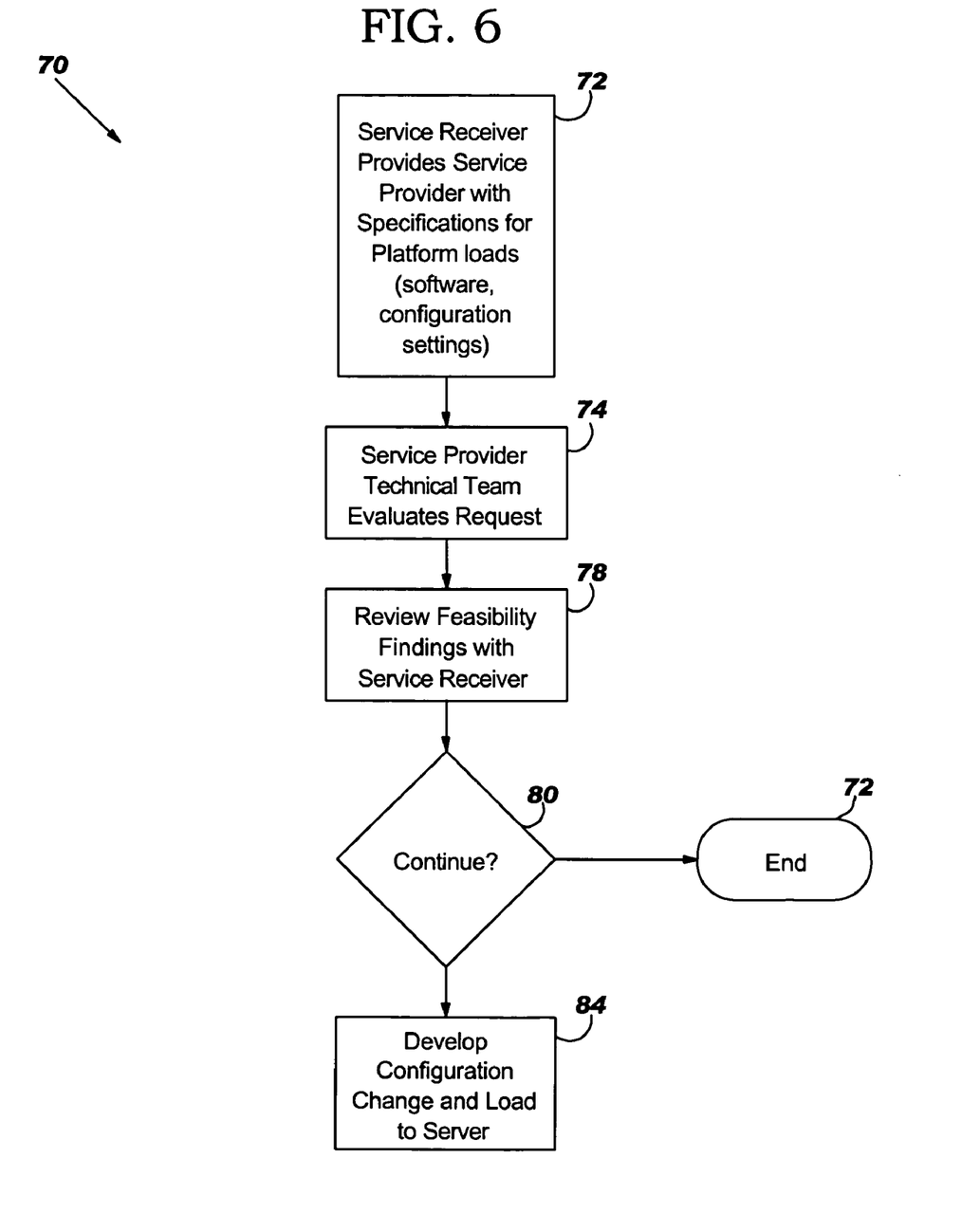
FIG. 6 is a flowchart illustrating an algorithm detailing the configuration management step of FIG. 2, in accordance with embodiments of the present invention.

FIG. 6 is a flowchart illustrating an algorithm 70 detailing the plan configuration management step 24 of FIG. 2, in accordance with embodiments of the present invention. This unique segment of the method enables the service provider to plan and develop configuration changes for the wireless devices 8 and store those changes on the server 4 for implementation as described, supra. The algorithm 70 also considers the incorporation of customer created applications also required as part of a suite of software to be offered to the customer. In step 72, the service receiver defines their application and configuration change requirements and request said changes (i.e., service receiver provides service provider with specifications for platform loads (e.g., software configuration settings, etc.). Alternatively, the request for an application or configuration change may originate from an internal source (i.e., the service provider) where a change is required to fix a bug in software comprised by the wireless device 8. In step 74, the request is evaluated by a technical specialist and/or other members of a team belonging to the service provider. The team will meet to evaluate a feasibility of the request and determine whether it can be undertaken. Some points to take into consideration may include, inter alia, how will the change impact the wireless devices 8 (e.g., do they have enough memory, are the processors fast enough, etc.), how will the change affect a bandwidth of the wireless network 5 (color images for example), etc. In step 78, the service provider will contact the service receiver (i.e., customer) to review/discuss any feasibility findings. In step 80 a determination is made as to approve or deny the request for an application or configuration change. If the request for an application or configuration change is denied in step 80, then the method ends in step 82. If the request for an application or configuration change is approved in step 80, then the service providers develop the required configuration change in step 84. Prior to a release of the configuration change, said change will be reviewed by a change management team (for service provider) to draft a means for releasing the changes. The change management team will also identify a period of time when the changes may be released (e.g., non-business hours for the service receiver). The configuration changes are developed and stored in the server 4. Additionally, the server 4 is used to automatically distribute the configuration changes remotely over the wireless network 5 to the service receiver.

Figure 7:
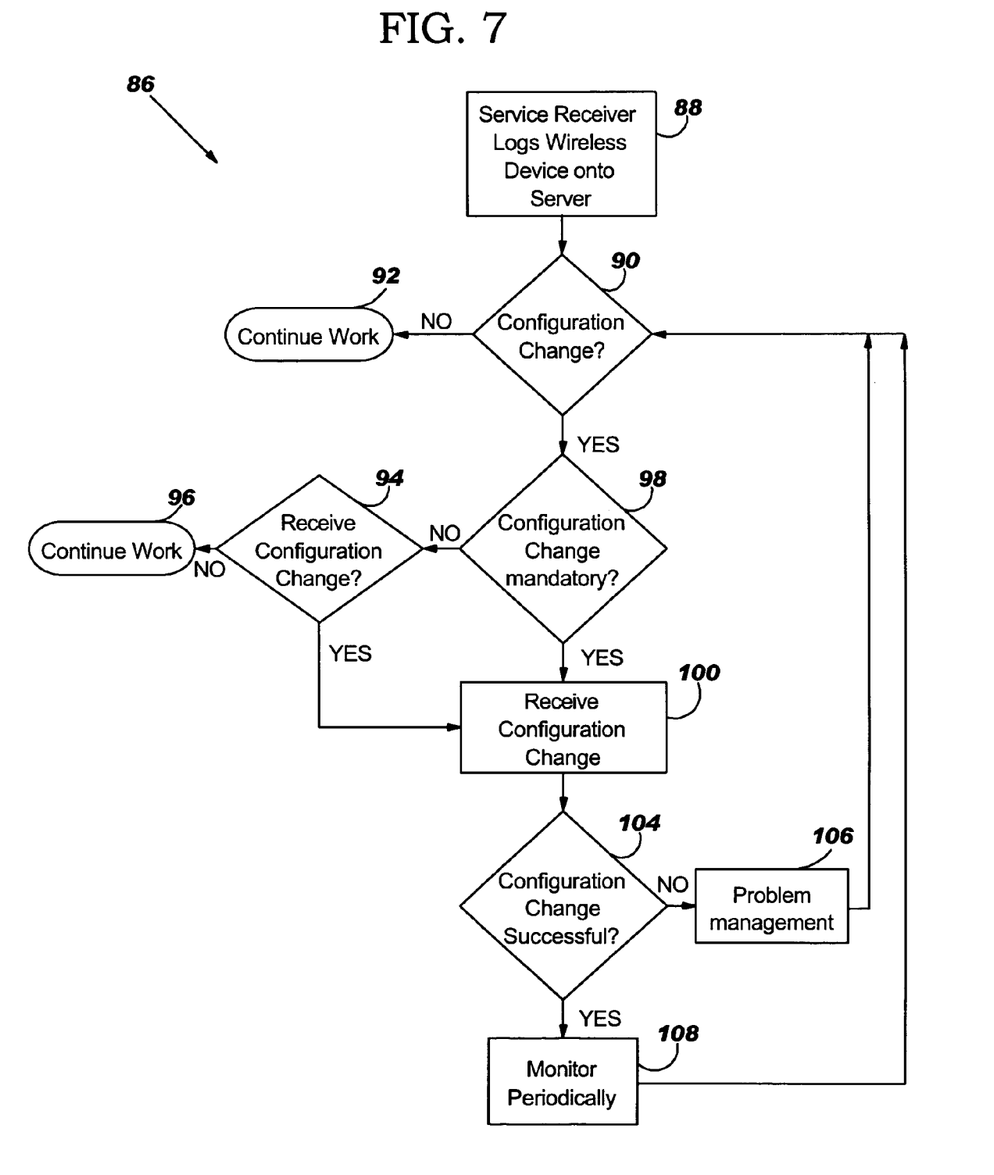
FIG. 7 is a flowchart illustrating an algorithm detailing the configuration management and software distribution step of FIG. 2, in accordance with embodiments of the present invention.

FIG. 7 is a flowchart illustrating an algorithm 86 detailing the configuration management and software distribution step (i.e., perform configuration changes step 26) of FIG. 2, in accordance with embodiments of the present invention. The algorithm 86, illustrates how the server 4 is implemented to automatically distribute configuration changes (i.e., perform configuration management) remotely over the wireless network 5 to the service receiver (i.e., wireless devices 8). In step 88, the service receiver logs the wireless devices 8 onto the server 4 through the wireless network 5 and establishes a configuration management session. Upon login, the server 4 monitors the wireless device 8 to determine if any configuration changes (e.g., software updates, new software, software fix, etc.) should be performed. In step 90, the server determines if any configuration changes (e.g., software upgrade, new software, software fix, etc.) should be performed for the wireless device 8. If in step 90 the server 4 determines that a configuration change should not be performed, then the service receiver may continue to use the wireless device 8 for it's intended function (e.g., data synchronization, data access requests, communication, etc.) in step 92. If in step 90 the server 4 determines that a configuration change should be performed, then the server 4 determines if the configuration change is mandatory (i.e., must be performed) or optional (i.e., the service receiver determines) in step 98.

If the server 4 determines in step 98 that the configuration change is mandatory, then in step 100, the mandatory configuration change is automatically applied (received) to the wireless device 8. In step 104, the server 4 determines if the configuration change applied to the wireless device 8 has been successful (e.g., configuration change complete without errors). If in step 104 the server 4 determines that the configuration change has been successful, then a technical staff (i.e., for the service provider) responsible for the successful execution of configuration changes, sends a notification to an asset management staff (i.e., staff belonging to the service provider that is responsible for maintaining asset inventories for the service receiver) that the configuration change was completed successfully. The asset management staff will then initiate a periodic scan (monitoring) in step 108 to collect updated information from the wireless device 8 for asset tracking. Asset tracking comprises monitoring a hardware (e.g., memory available) and software (e.g., software loaded on wireless device 8) configuration of the wireless device 8. The asset tracking information is used to maintain and update the hardware and software configuration for the wireless device 8. The algorithm 86 goes back to step 90 to determine if a configuration change should be performed. If in step 104 the server 4 determines that the configuration change has not been successful then a problem management process (i.e., troubleshooting) is executed in step 106 and the configuration change will be requested again in step 90.

If the server 4 determines in step 98 that the configuration change is not mandatory, then the service receiver is prompted to determine if they want to apply (receive) the configuration change to the wireless device 8. If in step 94 the service receiver determines that they do not want to apply the configuration change then the service receiver may continue to use the wireless device 8 for it's intended function (e.g., data synchronization, data access requests, communication, etc.) in step 96. If in step 94 the service receiver determines that they do want to apply the configuration change then in step 100, the configuration change is applied to the wireless device 8 and the algorithm goes to step 104 as described, infra.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for distributing a wireless device with pre-loaded software and hardware, the method comprising the steps of:
    a computer system receiving a request from a requestor, via a wireless network, for the wireless device, the request identifying a wireless network carrier, the wireless device, and software to be pre-loaded into the wireless device, the request additionally identifying hardware to be pre-installed in the wireless device;
    in response to the request, the computer system determining hardware and/or software requirements for the software and a standard configuration for the wireless device;
    in response to the hardware and/or software requirements of the software and the standard configuration, the computer system loading the software on the wireless device;
    installing the hardware in the wireless device;
    delivering to the requestor, the wireless device comprising the software and the hardware;
    connecting the delivered wireless device to the wireless network;
    the computer system subsequently monitoring via the wireless network for a specified time period, the hardware and the software on the delivered wireless device and detecting a change for a configuration of the software;
    the computer system determining that the change to the configuration of the software on the delivered wireless device requires a software update;
    identifying a specific period of time for releasing the software update;
    in response to the determination that the change to the configuration of the software requires the software update, the computer system downloading during the specific period of time, the software update to the delivered wireless device for installation on the delivered wireless device;
    subsequently determining via the wireless network, a change to a configuration of the hardware on the delivered wireless device; and
    implementing via the wireless network, the change to the configuration of the hardware on the delivered wireless device.

2. The method of claim 1, further comprising:
    receiving a second request for software distributions; and
    downloading the software distributions through the wireless network the delivered wireless device in response to the second request.

3. The method of claim 2, further comprising:
    tracking through the wireless network, the software; and
    automatically downloading through the wireless network, the software distributions to the delivered wireless device in response to the tracking.

4. The method of claim 1, further comprising the step of providing technical support through the wireless network for the delivered wireless device.

5. The method of claim 4, wherein the step of providing the technical support comprises the step of troubleshooting the delivered wireless device.

6. The method of claim 1, further comprising:
    disconnecting the wireless device from the wireless network;
    replacing the wireless device with a second wireless device; and
    connecting the second wireless device to the wireless network.

7. The method of claim 1, further comprising the step of testing, via the wireless network, the software on the wireless device.

8. The method of claim 1, wherein the wireless device is selected from the group consisting of a personal data assistant (PDA), a pocket personal computer, a cellular telephone, and a laptop computer.

9. A method for receiving a wireless device with preloaded software and hardware, the method comprising the steps of:
    submitting by a requestor, via a wireless network to a computer system, a request for the wireless device, the request identifying a wireless network carrier, the wireless device, and software to be pre-loaded into the wireless device, the request additionally identifying hardware to be pre-installed in the wireless device, in response to the request, the computer system: determining hardware and/or software requirements for the software and a standard configuration for the wireless device and in response to the hardware and/or software requirements of the software and the standard configuration, loading the software on the wireless device;
    the requestor receiving the wireless device comprising the software and the hardware;
    connecting the delivered wireless device to the wireless network;
    the wireless device receiving subsequent monitoring, via the wireless network for a specified time period, of the hardware and the software on the received wireless device, the computer system detecting a change for a configuration of the software, the computer system determining that the change to the configuration of the software on the received wireless device requires a software update to be released during an identified period of time;
    in response to the determination that the change to the configuration of the software requires the software update, the wireless device downloading during the identified period of time, the software update for installation on the received wireless device, the computer system subsequently determining via the wireless network, a change to a configuration of the hardware on the received wireless device; and receiving, by the received wireless device via the wireless network, the change to the configuration of the hardware.

10. The method of claim 1, further comprising the step of:
the computing system determining that the monitoring step is mandatory based on user input.

11. The method of claim 1, further comprising:
the computing system determining if the changing of the configuration of the hardware has been completed without any errors.

12. The method of claim 11, wherein the step of the computing system determining if the changing of the configuration of the hardware determines that the changing of the configuration of the hardware has been completed with errors, and wherein the method further comprises the steps of:
executing a problem management process; and
receiving, by the wireless device through the wireless network in response to results of the executing, an additional configuration change of the hardware.

13. The method of claim 11, wherein the determining determines that the changing of the configuration of the hardware has been completed without any errors, and wherein the method further comprises:
transmitting a notification indicating a successful configuration change; and
monitoring, in response to the notification, a hardware and software configuration of the delivered wireless device through the wireless network.

14. The method of claim 1, further comprising:
defining and documenting security controls associated with types of wireless devices.

15. The method of claim 1, further comprising:
activating specified airtime for the delivered wireless device, wherein the specified airtime is dependent on a geographic coverage area of a selected wireless network carrier, a location of an integration center in relation to the selected wireless network carrier, a signal strength of the selected wireless network carrier's network, and an amount of time for the selected wireless network carrier to perform the activating.

16. The method of claim 1, wherein the request further identifies hardware installation requirements and software revision requirements, wherein the hardware installation requirements comprise hardware revision levels and tool requirements, and wherein the software installation requirements comprise software version requirements and specific software configurations.

17. The method of claim 1, further comprising:
the computing system defining procedure requirements in response to a command from a service provider, wherein the procedure requirements hardware assembly layouts, hardware testing procedures, software installations and configuration builds, and initialization and wireless device testing procedures.

18. The method of claim 1, wherein the software includes applications created by the requester.

19. The method of claim 1, further comprising:
the computing system determining how the software update will affect a bandwidth of the wireless network.

20. The method of claim 1, further comprising:
the computing system establishing a configuration management session.

* * * * *